United States Patent
Fu et al.

(10) Patent No.: US 11,382,114 B2
(45) Date of Patent: Jul. 5, 2022

(54) METHOD AND APPARATUS FOR PROCESSING AUTONOMOUS TRANSMISSION OF USER EQUIPMENT

(71) Applicant: GUANGDONG OPPO MOBILE TELECOMMUNICATIONS CORP., LTD., Dongguan (CN)

(72) Inventors: Zhe Fu, Dongguan (CN); Jing Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/412,672

(22) Filed: Aug. 26, 2021

(65) Prior Publication Data
US 2021/0392662 A1 Dec. 16, 2021

Related U.S. Application Data

(63) Continuation of application No. PCT/CN2019/129451, filed on Dec. 27, 2019.

(51) Int. Cl.
*H04W 72/12* (2009.01)
*H04L 1/18* (2006.01)
(Continued)

(52) U.S. Cl.
CPC ....... *H04W 72/1263* (2013.01); *H04L 1/1896* (2013.01); *H04W 72/0446* (2013.01); *H04W 72/14* (2013.01)

(58) Field of Classification Search
None
See application file for complete search history.

(56) References Cited

U.S. PATENT DOCUMENTS

| | | | | |
|---|---|---|---|---|
| 11,184,924 B2* | 11/2021 | Yang | ...................... | H04L 1/1819 |
| 2006/0023629 A1* | 2/2006 | Kim | .................. | H04W 72/1284 |
| | | | | 370/235 |

(Continued)

FOREIGN PATENT DOCUMENTS

| | | |
|---|---|---|
| CN | 101488906 A | 7/2009 |
| CN | 102217405 A | 10/2011 |

(Continued)

OTHER PUBLICATIONS

Convida Wireless. 3GPP TSG RAN WG1 Meeting #94bis R1-1811626 Potential Enhancements to Configured Grants, Oct. 12, 2018, Section 2, 5 pages.

(Continued)

*Primary Examiner* — Hong S Cho
(74) *Attorney, Agent, or Firm* — Sheppard, Mullin, Richter & Hampton LLP

(57) ABSTRACT

A method for processing autonomous transmission of a User Equipment (UE), and a corresponding apparatus are provided. In the method, the UE receives first information transmitted by a network device. The first information includes autonomous transmission information, or information indicating activation or configuration of the autonomous transmission. The UE determines whether the autonomous transmission is configured or activated based on the first information. If it is determined from the first information that the autonomous transmission is configured or activated, the autonomous transmission is performed based on the first information. With the method, the autonomous transmission can be controlled based on the first information transmitted by a network, such that the implementation complexity of the UE can be reduced when the autonomous transmission of the UE and a network scheduled retrans- (Continued)

mission coexist, and the process is simple and clear, thereby reducing complexity of the UE and standardization work.

20 Claims, 3 Drawing Sheets

(51) Int. Cl.
  *H04W 72/14* (2009.01)
  *H04W 72/04* (2009.01)

(56) References Cited

U.S. PATENT DOCUMENTS

2019/0297620 A1* 9/2019 Tian ............... H04W 28/06
2019/0394798 A1* 12/2019 Tomeba ............ H04W 16/14

FOREIGN PATENT DOCUMENTS

| CN | 106507497 A | 3/2017 |
| CN | 109756973 A | 5/2019 |
| CN | 109845374 A | 6/2019 |
| EP | 1063805 A2 | 12/2000 |

OTHER PUBLICATIONS

3GPP (3rd Generation Partnership Project), "3rd Generation Partnership Project; Technical Specification Group Radio Access Network; NR; User Equipment (UE) radio access capabilities (Release 16)," 3GPP TS 38.306 V16.2.0, Sep. 2020, 110 pages.
3GPP (3rd Generation Partnership Project), "3rd Generation Partnership Project; Technical Specification Group Radio Access Network; NR; Radio Resource Control (RRC) protocol specification (Release 16)," 3GPP TS 38.331 V16.2.0, Sep. 2020, 919 pages.
International Search Report and Written Opinion date Sep. 25, 2020 in International Application No. PCT/CN2019/129451. English translation attached.
Convida Wireless."3GPP TSGRAN WG1 Meeting #94bis R1-18116267—Potential Enhancements to Configured Grants", Oct. 12, 2018, Section 2, 5 pages.
Huawei et al."3GPP TSG RAN WG1 Adhoc MeetingR1-1700022—On DL multiplexing of URLLC and eMBB transmissions", Jan. 20, 2017, full text, 12 pages.
Extended European Search Report dated Apr. 20, 2022 received in European Patent Application No. EP 19958045.7.
Qualcomm Incorporated:"Miscellaneous aspects of autonomous uplink transmission", 3GPP Draft R1-1720407 Miscellanous Aspects of Autonomous Uplink Transmission, 3RD Generation Partnership Project (3GPP), Mobile Competence Centre ; 650 , Route Des Lucioles; F-06921 Sophia-Antipolis, vol. RAN WG1 , No. Reno , USA; Nov. 27, 2017-Dec. 1, 2017, Nov. 18, 2017 (Nov. 18, 2017), XP051369970.
Spreadtrum Communications: "Autonomous Uplink Transmission in NR-U" ,3GPP Draft; R2-1900939 Autonomous Uplink, Transmission in NR-U, 3rd Generation, Partnership Project (3GPP), Mobile Competence Centre ; 650 , Route Des Lucioles; F-06921 Sophia-Ant Ipolis Cedex France , vol. RAN WG2 , No. Athens, Greece; Feb. 25, 2019-Mar. 1, 2019, Feb. 15, 2019 (Feb. 15, 2019), XP051602309.
Nokia:"Support of NR Industrial Internet of Things (IOT)" ,3GPP Draft; RP-192589, 3RD Generation Partnership Project (3GPP), Mobile Competence Centre; 650, Route Des Lucioles; F-06921 Sophia-Ant Ipolis Cedex ; FRANCE, vol. TSG RAN, No. Sitges, Spain; Dec. 9, 2019- Dec. 12, 2019, Dec. 2, 2019 (Dec. 2, 2019), XP051834237.

* cited by examiner

METHOD AND APPARATUS FOR PROCESSING AUTONOMOUS TRANSMISSION OF USER EQUIPMENT

CROSS-REFERENCE TO RELATED APPLICATION

The present application is a continuation of International Application No. PCT/CN2019/129451, filed on Dec. 27, 2019, which is incorporated herein by reference in its entirety.

TECHNICAL FIELD

The present disclosure relates to the field of communication technologies, and more particularly, to a technical field of a method and an apparatus for processing autonomous transmission of a User Equipment (UE).

BACKGROUND

The $5^{th}$ Generation (5G) Industrial Internet of Things (IIoT) needs to support transmission of services such as factory automation, transport industry, and electrical power distribution in the 5G system. Based on transmission requirements on delay and reliability, the IIoT introduces a concept of a Time-Sensitive Network (TSN) or a Time Stamp Counter (TSC). Therefore, a probability that resources configured for one user collide in time is a problem that needs to be solved. For intra-user priority, a scenario involving various collisions, such as Configured Grant (CG) vs. CG, Dynamic Grant (DG) vs. DG, Uplink Control Information (UCI) vs. grant, DG vs. CG, and the like, is supported. Specifically, for example, in an Ultra Reliability and Low Latency Communication (URLLC) scenario, a base station may schedule an Uplink (UL) grant for URLLC after scheduling a UL grant for an enhanced Mobile Broadband (eMBB) service, with the two grants overlapping in time. In this case, a Medium Access Control (MAC) entity may have packetized each grant, but only one grant is transmitted to a peer entity. For example, a UE may transmit one grant to a network side. In this case, two MAC Protocol Data Units (MAC PDUs) are packetized, but only one MAC PDU is transmitted, and the other MAC PDU, i.e., de-prioritized MAC PDU, is not transmitted due to overlapping. According to the current protocol, this data packet will be overwritten subsequently, thereby causing data loss in the data packet.

So how can the problem of data loss be solved?

In the current protocol, only a collision scenario between a DG and a CG exists and is defined. For such scenario, only transmission over the resource of the DG will be prioritized. Regardless of whether there is a collision scenario, in the current protocol, only one uplink resource will be selected and only one MAC PDU will be packetized or generated, while no de-prioritized MAC PDU will be present.

Release 16 (R16) supports different resource collision scenarios, including DG vs. CG, CG vs. CG, DG vs. DG, and UL-Shared Channel (SCH) vs. UCI. In any of these scenarios, the de-prioritized MAC PDU may be present. That is, although data corresponding to this resource is not transmitted at a Physical Layer (PHY) due to the collision, the MAC PDU corresponding to this resource has been packetized and stored in a Hybrid Automatic Repeat reQuest (HARD).

In some cases, since a network cannot determine whether the UE has already packetized de-prioritized MAC PDU for a resource corresponding to the de-prioritized grant, the network does not always schedule retransmission of the de-prioritized MAC PDU. Therefore, it is possible that the UE has packetized the de-prioritized MAC PDU but the network does not know that the UE has packetized the de-prioritized MAC PDU, thereby resulting in no retransmission being scheduled. In order to ensure that the de-prioritized MAC PDU can be retransmitted in this case, especially when the de-prioritized MAC PDU is associated with a URLLC service, Radio Access Network (RAN) Work Group 2 (WG2) (RAN2) introduces a method for autonomous transmission of UE. That is, for a corresponding CG, both a scheduled retransmission of the de-prioritized MAC and autonomous transmission of the UE are supported. Therefore, when the scheduled retransmission and the autonomous transmission of the UE coexist, in order to deal with the relationship between the scheduled retransmission and the autonomous transmission of the UE, the complexity of the UE and the standardization work may increase, which is a problem that needs to be solved.

SUMMARY

The present disclosure provides a method and an apparatus for processing autonomous transmission of a UE.

The present disclosure provides the following technical solutions.

A method for processing autonomous transmission of a UE is provided. The method is applied in the UE. The method includes: receiving, by the UE, first information including autonomous transmission information or information indicating activation or configuration of the autonomous transmission; and performing the autonomous transmission based on the first information, in response to determining from the first information that the autonomous transmission is configured or activated.

A method for processing autonomous transmission of a UE is provided. The method is applied in a network device. The method includes: receiving, by the network device, capability information of the UE, wherein the capability information includes at least one of a capability to support the autonomous transmission, a capability to handle coexistence of the autonomous transmission and a scheduled retransmission, a collision handling capability, and a resource processing capability; determining whether to configure or activate the autonomous transmission of the UE based on second information, the second information including at least one of capability information, a scheduling policy, service information, and resource configuration information; and transmitting first information, the first information being used for determining whether the UE is to perform the autonomous transmission.

An apparatus for processing autonomous transmission of a UE is provided. The apparatus includes: a first information receiving module configured to receive first information, the first information including autonomous transmission information or information indicating activation or configuration of the autonomous transmission; and an autonomous transmission module configured to perform the autonomous transmission based on the first information, in response to determining from the first information that the autonomous transmission is configured or activated.

An apparatus for processing autonomous transmission of a UE is provided. The apparatus includes: a capability information receiving module configured to receive capability information reported by the UE, the capability information including at least one of a capability to support the autonomous transmission, a capability to handle coexistence of the autonomous transmission and a scheduled retransmission, a collision handling capability, and a resource processing capability; an autonomous transmission determining module configured to determine whether to configure or activate the autonomous transmission of the UE based on second information, the second information including at least one of capability information, a scheduling policy, service information, and resource configuration information; and a first information transmitting module configured to transmit first information, the first information being used for determining whether the UE is to perform the autonomous transmission.

An apparatus for processing autonomous transmission of a UE is provided. The apparatus includes a processor, a memory, and a network interface. The processor is configured to invoke a program in the memory to perform the method for processing the autonomous transmission of the UE according to any one of claims 1 to 13, and transmit a result of said performing via the network interface.

A chip is provided. The chip includes a processor configured to invoke and run a computer program from a memory, whereby a device provided with the chip is operative to perform the method for processing the autonomous transmission of the UE according to any one of claims 1 to 13.

A computer-readable storage medium is provided. The computer-readable storage medium stores a program for performing a method for processing autonomous transmission of UE. The program for performing the method for processing the autonomous transmission of the UE, when executed by a processor, implements the method for processing the autonomous transmission of the UE according to any one of claims 1 to 13.

A computer program product is provided. The computer program product is stored in a non-transitory computer-readable storage medium. A computer program, when executed, implements the method for processing the autonomous transmission of the UE according to any one of claims 1 to 13.

The present disclosure can provide the following advantageous effects. With the method for processing autonomous transmission of a UE, the UE receives first information transmitted by a network device. The first information includes autonomous transmission information, or information indicating activation or configuration of the autonomous transmission. The UE determines whether the autonomous transmission is configured or activated based on the first information. If it is determined from the first information that the autonomous transmission is configured or activated, the autonomous transmission is performed based on the first information. With the method, the autonomous transmission can be controlled based on the first information transmitted by a network, such that the implementation complexity of the UE can be reduced when the autonomous transmission of the UE and a network scheduled retransmission coexist, and the process is simple and clear, thereby reducing complexity of the UE and standardization work.

DESCRIPTION OF EMBODIMENTS

In order to make the objects, technical solutions, and advantages of the present disclosure more apparent, the present disclosure will be described in detail with reference to the accompanying drawings and embodiments. It should be understood that the embodiments described here are only used to explain, rather than limiting, the present disclosure. However, the present disclosure can be implemented in many different forms and is not limited to the embodiments described herein. On the contrary, the embodiments are provided to facilitate thorough and comprehensive understanding of the present disclosure.

Unless otherwise defined, all technical and scientific terms used herein have the same meaning as commonly understood by those skilled in the art of the present disclosure. Terms in the specification of the present disclosure herein are only used for the purpose of describing specific embodiments, and are not intended to limit the present disclosure. The term "and/or" as used herein includes any and all combinations of one or more related listed items.

The embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolved NR system, an LTE-based access to unlicensed spectrum (LTE-U) system, an NR-based access to unlicensed spectrum (NR-U) system, a Universal Mobile Telecommunication System (UMTS), a Wireless Local Area Network (WLAN), a Wireless Fidelity (WiFi), a next-generation of communication system, or other communication systems, etc.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), Vehicle to Vehicle (V2V) communication, etc. The embodiments of the present disclosure can also be applied to these communication systems.

Optionally, the communication system according to an embodiment of the present disclosure can be applied to a Carrier Aggregation (CA) scenario, a Dual Connectivity (DC) scenario, and a Standalone (SA) operation scenario.

The embodiment of the present disclosure is not limited to the frequency spectrum to which it is applied. For example, an embodiment of the present disclosure can be applied to a licensed spectrum or an unlicensed spectrum.

Figure 1:
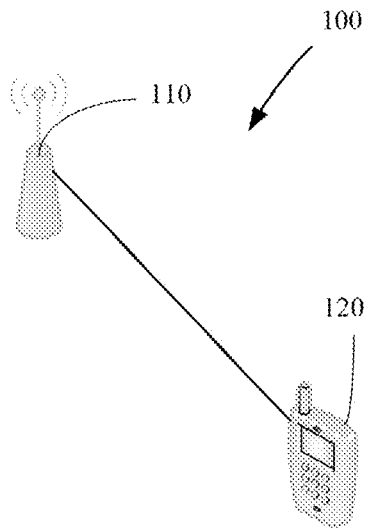
FIG. 1 is a system architecture diagram in which an embodiment of the present disclosure can be applied.

FIG. 1 illustrates a wireless communication system 100 in which an embodiment of the present disclosure can be applied. As illustrated in FIG. 1, the wireless communication system 100 includes a network device 110 and at least one UE 120 located within coverage of the network device 110. The UE 120 reports capability information to the network device 110. The network device 110 determines whether to configure or activate autonomous transmission of the UE 120 based on second information, and transmits first information to the UE 120. The second information is used for determining whether the UE performs the autonomous transmission.

Optionally, the wireless communication system 100 may include a plurality of network devices, and a different number of UEs may be located within the coverage of each network device. The embodiment of the present disclosure is not limited in this regard.

The network device 110 may provide communication coverage for a specific geographic area, and may communicate with user devices (e.g., the UEs) located in the coverage. Optionally, the network device 100 may be a base station such as Base Transceiver Station (BTS) in a GSM system or a CDMA system, a base station such as NodeB (NB) in a WCDMA system, a base station such as Evolutional Node B (eNB or eNodeB) in an LTE system, or a wireless controller in a Cloud Radio Access Network (CRAN). Alternatively, the network device can be a relay station, an access point, a vehicle-mounted device, a wearable device, a network side device in a 5G network, or a network device in a future evolved Public Land Mobile Network (PLMN), etc.

The UE 120 can be mobile or fixed. Optionally, the UE 120 can refer to an access terminal, UE, a user unit, a user station, a mobile station, a mobile platform, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, UE in a 5G network, or UE in the future evolved PLMN, etc.

The following embodiments of the present disclosure will elaborate on how the UE performs autonomous transmission. It should be noted that the autonomous transmission can also include autonomous retransmission.

Embodiment 1

Figure 2:
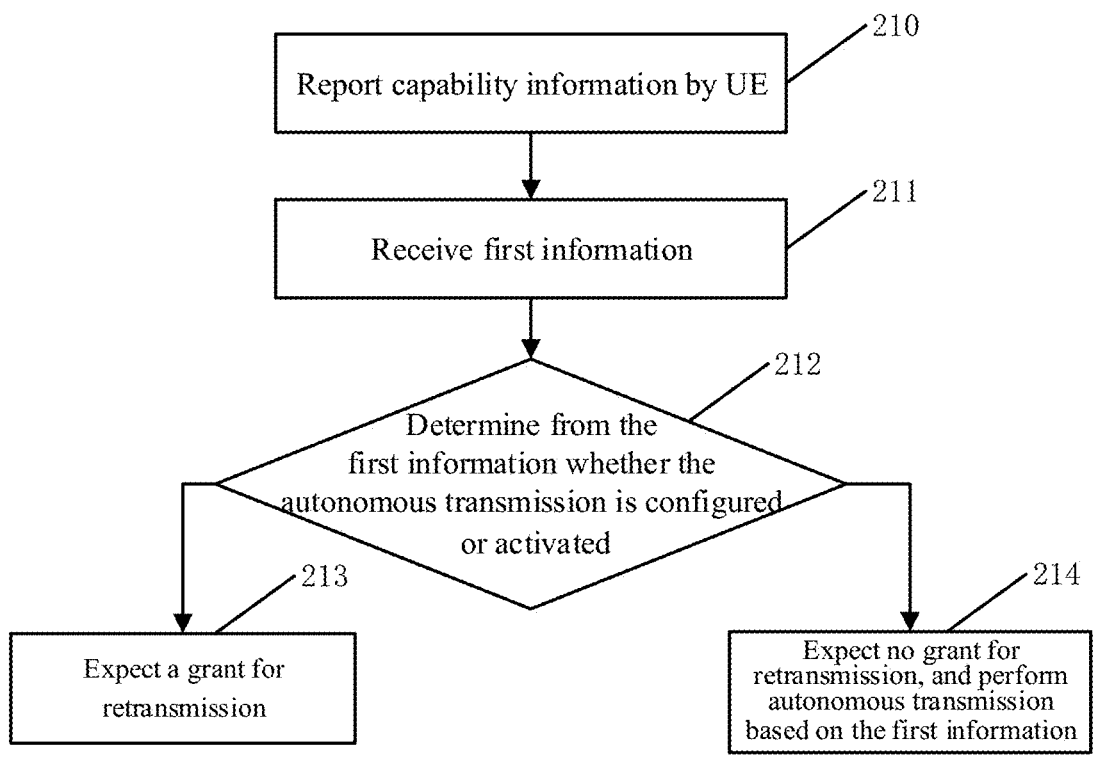
FIG. 2 is a data flowchart illustrating a method for processing autonomous transmission of a UE according to Embodiment 1 of the present disclosure.

FIG. 2 illustrates a method for processing autonomous transmission of a UE according to Embodiment 1 of the present disclosure. As illustrated in FIG. 2, the method may include the following steps.

In step 210, the UE reports capability information.

The UE reports the capability information based on its own capabilities. The capability information may include, but not limited to, at least one of the following capabilities, including:

a: a capability to support autonomous transmission, i.e., the capability of supporting the autonomous transmission or not;

b: a capability to allow coexistence of the autonomous transmission and a scheduled retransmission, i.e., the capability of supporting the coexistence of the autonomous transmission and the scheduled retransmission or not;

c: a collision handling capability, i.e., the capability of supporting collision handling, such as Rel-16 collision handling, or not;

d: a resource processing capability, e.g., the capability to support TSC/URLLC;

e: a terminal processing capability, e.g., the capability of time multiplexing, time coding, etc.

Specifically, the UE can report the above capability information autonomously, e.g., when a TSC service arrives and the TSC service is supported; or the above capability information can be reported based on network triggering, e.g., when a capability request transmitted by a network device is received.

The network device receives the capability information transmitted by the UE, and performs resource configuration for the UE based on the capability information. Specifically, the resource configuration may include at least one of the following:

a: configuration of a CG resource, including a CG index, HARQ process information (such as an HARQ process number, an HARQ process identifier), etc.

b: determination as to whether to configure or activate an autonomous transmission function of the UE. Specifically, it is determined based on second information whether to configure or activate the autonomous transmission function of the UE. The second information may include at least one of: the capability information of the UE, service information (such as whether the TSC service is supported, a service characteristic of the supported TSC service, whether the TSC service is to be transmitted or being transmitted, etc.), a scheduling policy, resource configuration information (such as whether there is configuration or scheduling for a resource collision, whether there is a CG configuration, whether CGs with a same HARQ process are configured, and whether there are CGs for a same HARQ process), and the like. After determining whether to configure or activate the autonomous transmission of the UE based on the second information, the network device transmits first information to the UE. The first information is used for determining whether the UE is to perform the autonomous transmission. Optionally, the first information from the network device may include no autonomous transmission information or indicate no activation or configuration of the autonomous transmission, or may include the autonomous transmission information or indicate the activation or the configuration of the autonomous transmission. The autonomous transmission information, or information indicating the activation or the configuration of the autonomous transmission may include a first time length. The first time length is used for determining whether to enable the autonomous transmission of the UE and/or time for the UE to perform the autonomous transmission and/or time to schedule a retransmission for the UE. When the first information includes no autonomous transmission information, or indicates no activation or configuration of the autonomous transmission, a retransmission is scheduled for the UE. When the first information includes the autonomous transmission information, or indicates the activation or the configuration of the autonomous transmission, no retransmission is scheduled for the UE. When the first information includes the autonomous transmission information, or indicates the activation or the configuration of the autonomous transmission, a retransmission is scheduled for the UE when a predetermined condition is satisfied. The predetermined condition can be, for example, a de-prioritized MAC PDU being present or saved and the UE not being able to autonomously transmit the de-prioritized MAC PDU due to lack of CG resource, or a de-prioritized MAC PDU being present or saved and the network device not expecting the UE to perform autonomous transmission, or the like. Of course, the predetermined condition can be set based on specific conditions and requirements, or it can be e.g., a de-prioritized MAC PDU being present or saved but no autonomous retransmission being received within the first time length, or a de-prioritized MAC PDU being present or saved but no autonomous retransmission being received after the first time length lapses, and the present disclosure is not limited to any of these examples.

Optionally, in another embodiment, if the network device receives no autonomous transmission from the UE side within the first time length, the network device may determine that there is no de-prioritized MAC PDU, and/or the network device may schedule no retransmission.

The network device can explicitly instruct the configuration or the activation of the autonomous transmission function of the UE, or implicitly instruct the configuration or the activation of the autonomous transmission function of the UE via, for example, the first time length. The first time length can be included in the autonomous transmission information, or the information indicating the activation or the configuration of the autonomous transmission. The first time length is used for determining whether to enable the autonomous transmission and/or the time for the UE to perform the autonomous transmission and/or time for the network to schedule a retransmission. The first time length can be a first timer that is non-predetermined or non-predefined. Optionally, the first timer may be a timer configured by the network. Of course, the network may also transmit an activation instruction for activating a second timer that is predetermined or predefined.

If the first time length is configured or activated, the start time of the first time length can be transmission time of the de-prioritized MAC PDU/grant. Specifically, the transmission time can include: time at which the de-prioritized MAC PDU/grant is determined, start time (e.g., the first symbol) of a Physical Uplink Shared Channel (PUSCH) resource of the de-prioritized MAC PDU, end time of the PUSCH resource (e.g., the last symbol of the PUSCH, the first symbol at the end of the PUSCH) of the de-prioritized MAC PDU, time at which the de-prioritized MAC PDU/grant is dropped, and time at which the deprioritized MAC PDU/grant is determined based on an indication (e.g., upon reception of a physical layer indication).

c: configuration or activation of the autonomous transmission function of the UE based on a first granularity. The first granularity may be UE, MAC entity, CG, or HARQ. Accordingly, corresponding identifier information or identifier list information can be indicated, including e.g., a cell group index, an HARQ index, a CG index, a CG index list, or the like.

If the network device configures or activates the autonomous transmission of the UE, the network device does not schedule a retransmission for the de-prioritized grant or MAC PDU within the first time length. That is, the UE does not expect a grant for retransmission from the network side. If the network device does not configure or activate the autonomous transmission of the UE, the network device can schedule a retransmission for the de-prioritized grant or MAC PDU. That is, the UE expects a grant for retransmission from the network side. Further, the network device may also schedule a retransmission for the de-prioritized grant or MAC PDU within the first time length or a second time length. That is, the UE expects a grant for retransmission from the network side.

In at least one embodiment, the first time length may be configured by the network device based on a second granularity. The second granularity may be UE, MAC entity, CG, or HARQ. Accordingly, corresponding identifier information, or identifier list information can be indicated, including e.g., a cell group index, an HARQ index, a CG index, a CG index list, or the like.

After determining whether to configure or activate the autonomous transmission of the UE based on the second information, the network device transmits the first information to the UE.

Optionally, the network device can determine, based on the second information, whether to configure or activate the first time length and/or a length of the first time length. The second information may include at least one of the capability information of the UE, service information (such as whether the TSC service is supported, a service characteristic of the supported TSC service, whether the TSC service is to be transmitted or being transmitted, etc.), a scheduling policy, resource configuration information (such as whether there is configuration or scheduling of a resource collision, whether there is a CG configuration, whether CGs with a same HARQ process are configured, and whether there are CGs for a same HARQ process), and the like. After determining whether to configure or activate the autonomous transmission of the UE based on the second information, the network device transmits the first information to the UE. The first information is used for determining whether the UE is to perform the autonomous transmission. Optionally, the first information of the network device may include no autonomous transmission information or indicate no activation or configuration of the autonomous transmission, or may include the autonomous transmission information or indicate the activation or the configuration of the autonomous transmission. The autonomous transmission information or the information indicating the activation or the configuration of the autonomous transmission may include the first time length. The first time length is used for determining whether to enable the autonomous transmission of the UE and/or time for the UE to perform the autonomous transmission and/or time to schedule a retransmission for the UE. When the first information includes no autonomous transmission information, or indicates no activation or configuration of the autonomous transmission, a retransmission is scheduled for the UE. When the first information includes the autonomous transmission information, or indicates the activation or the configuration of the autonomous transmission, no retransmission is scheduled for the UE. When the first information includes the autonomous transmission information, or indicates the activation or the configuration of the autonomous transmission, a retransmission is scheduled for the UE when a predetermined condition is satisfied. The predetermined condition can be, for example, a de-prioritized MAC PDU being present or saved and the UE not being able to autonomously transmit the de-prioritized MAC PDU due to lack of CG resource, or a de-prioritized MAC PDU being present or saved and the network device not expecting the UE to perform autonomous transmission, or the like. Of course, the predetermined condition can be set based on specific conditions and requirements, or it can be e.g., a de-prioritized MAC PDU being present or saved but no autonomous retransmission being received within the first time length, or a de-prioritized MAC PDU being present or saved but no autonomous retransmission being received after the first time length lapses, and the present disclosure is not limited to any of these examples.

Optionally, in another embodiment, if the network device receives no autonomous transmission from the UE side within the first time length, the network device may determine that there is no de-prioritized MAC PDU, and/or the network device may schedule no retransmission.

The network device can explicitly instruct the configuration or the activation of the autonomous transmission function of the UE, or implicitly instruct the configuration or the activation of the autonomous transmission function of the UE via, for example, the first time length. The first time length can be included in the autonomous transmission information, or the information indicating the activation or the configuration of the autonomous transmission. The first time length is used for determining whether to enable the autonomous transmission and/or the time for the UE to perform the autonomous transmission and/or time for the network to schedule a retransmission. The first time length can be a first timer that is non-predetermined or non-predefined. Optionally, the first timer may be a timer configured by the network. Of course, the network may also transmit an activation instruction for activating a second timer that is predetermined or predefined.

After determining whether to configure or activate the autonomous transmission of the UE based on the second information, the network device transmits the first information to the UE.

Optionally, the network device can configure an indication indicating whether the first time length that is pre-configured is available or activated. Specifically, the first time length can be used only when it is indicated as activated or available. Specifically, a timer corresponding to the first time length can be used.

Optionally, the UE may wait for a grant for retransmission within the first time length, and perform the autonomous transmission after the first time length lapses. That is, the network can schedule the retransmission within the first time length, and receive the autonomous transmission from the UE after the first time length lapses.

In step 211, the first information is received.

The UE receives the first information transmitted by the network device. The first information includes the autonomous transmission information or the information indicating the activation or the configuration of the autonomous transmission.

In step 212, it is determined from the first information whether the autonomous transmission is configured or activated.

After receiving the first information transmitted by the network device, the UE determines whether the autonomous transmission is configured or activated based on the first information, thereby determining whether the autonomous transmission is configured or activated. If the autonomous transmission information includes an indication indicating the activation/the configuration, and/or includes the first time length, it is determined that the autonomous transmission function of the UE is configured or activated, and the method proceeds with step 214; otherwise, the method proceeds with step 213. That is, it is determined whether to configure or activate the autonomous transmission based on the autonomous transmission information. If the autonomous transmission is configured or activated, the autonomous transmission is performed; otherwise, no autonomous transmission is performed. The first time length is used for determining whether to enable the autonomous transmission and/or the time for the UE to perform the autonomous transmission and/or the time for the network to schedule a retransmission. The first time length may be the first timer that is non-predetermined or non-predefined, or the activation instruction. The activation instruction is used for activating the second timer that is predetermined or predefined. Optionally, the first timer may be configured by the network device.

In step 213, a grant for retransmission is expected.

If the autonomous transmission of the UE is not configured or activated, the UE does not perform the autonomous transmission. Specifically, if the first information transmitted by the network device does not include the first time length, or the first information does not include an autonomous transmission instruction, or includes an instruction to perform no autonomous transmission, the UE does not perform the autonomous transmission. Optionally, the UE may also transmit to the network device a request for a grant for retransmission from the network.

Specifically, if for a certain object, the autonomous transmission of the UE is not configured or enabled or not activated based on the first information transmitted by the network device, the UE does not autonomously transmit the object. Accordingly, the UE expects a grant for retransmission from the network side. Optionally, the UE transmits a request for a grant for retransmission to the network device.

In step 214, the grant for retransmission is not expected, and the autonomous transmission is performed based on the first information.

If the first information transmitted by the network device includes the first time length, or the first information includes an instruction to perform the autonomous transmission, the autonomous transmission of the UE is configured or enabled or activated, and the UE enables the autonomous transmission. That is, the autonomous transmission is performed within the first time length, i.e., a time length of the first timer or the second timer, and the indication that no grant retransmission is expected is transmitted to the network device. The network device does not schedule the retransmission within the time length of the first timer or the second timer.

Specifically, for a certain object, if the first information transmitted by the network device includes the first time length, or includes an autonomous transmission instruction, or includes an instruction to perform the autonomous transmission, the autonomous transmission of the UE is configured or enabled or activated. Then, the UE autonomously transmits the object within the first time length, and does not expect a grant for retransmission from the network side. The network device does not schedule the retransmission of the object within the first time length, and the network may schedule the retransmission of the object after the first time length lapses. The start time of the first time length can be determined transmission time of the de-prioritized MAC PDU/grant. Specifically, the transmission time can include: time at which the de-prioritized MAC PDU/grant is determined, start time (e.g., the first symbol) of a Physical Uplink Shared Channel (PUSCH) resource of the de-prioritized MAC PDU, end time of the PUSCH resource (e.g., the last symbol of the PUSCH, the first symbol at the end of the PUSCH) of the de-prioritized MAC PDU, time at which the de-prioritized MAC PDU/grant is dropped, and time at which the deprioritized MAC PDU/grant is determined based on an indication (e.g., upon reception of a physical layer indication).

For example, when a base station configures a configured grant index1 to activate the autonomous transmission of the UE, there is a de-prioritized MAC PDU for a resource corresponding to the configured grant index1. If there is an available CG resource within the first time length, the UE may perform the autonomous transmission within the time length of the first timer or the second timer, and a grant for retransmission from the network is not expected. The network device does not schedule a retransmission for the configured grant index1 within the time length of the first timer or the second timer. For another configured grant, such as a configured grant index2, if there is a de-prioritized MAC PDU, the UE does not perform the autonomous transmission and expects a grant for retransmission from the network. The network device can schedule a retransmission for the configured grant index2. It should be noted that the CG resource here can be a resource for the same CG or a different CG, and the present disclosure is not limited to any of these examples here.

Optionally, the network device determines whether to configure or activate the autonomous transmission of the UE based on the second information, and transmits the first information to the UE. The first information includes the autonomous transmission information, or the information indicating the activation or the configuration of the autonomous transmission, but the network device does not schedule any retransmission at any time.

Optionally, the network device determines whether to configure or activate the autonomous transmission of the UE based on the second information, and transmits the first information to the UE. The first information does not include the autonomous transmission information, or does not include the information indicating the activation or the configuration of the autonomous transmission. A retransmission is scheduled by the network device, and the UE never needs to perform any autonomous transmission. That is, the UE does not perform the autonomous transmission at this time.

According to Embodiment 1 of the present disclosure, the network device determines whether the UE configures or activates the autonomous transmission of the UE based on the second information, and transmits the first information to the UE. The first information includes the autonomous transmission information, or the information indicating the activation or the configuration of the autonomous transmission. After receiving the first information, the UE determines whether to enable the autonomous transmission of a certain object based on the first information. If the network device configures or activates the autonomous transmission of the UE, the network device does not schedule a retransmission within the first time. That is, the UE does not expect a grant for retransmission from the network. If the network device does not configure or activate the autonomous transmission of the UE, the network device can schedule a retransmission. That is, the UE expects a grant for retransmission from the network. With the method for processing the autonomous transmission of the UE according to this embodiment, the implementation complexity of the UE can be reduced when the autonomous transmission of the UE and a network scheduled retransmission coexist, and the process is simple and clear, thereby reducing complexity of the UE and standardization work.

Embodiment 2

Figure 3:
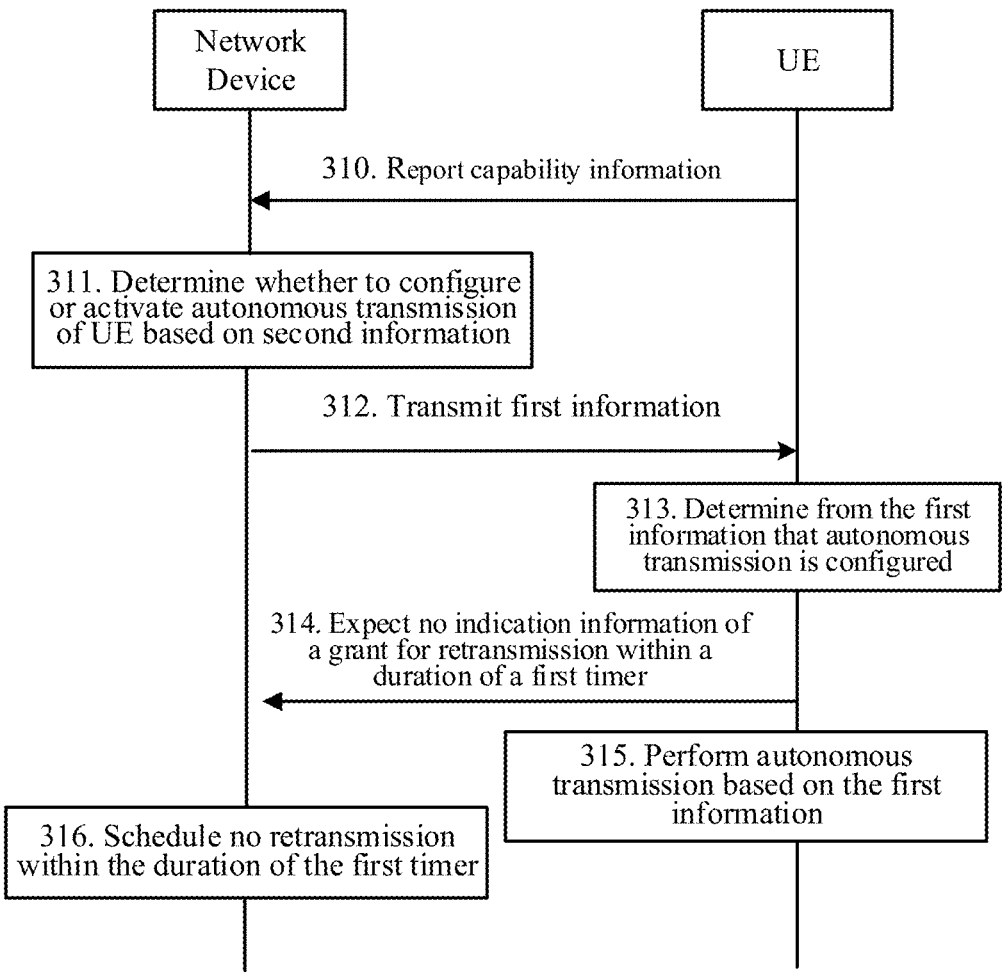
FIG. 3 is a data flowchart illustrating a method for processing autonomous transmission of a UE according to Embodiment 2 of the present disclosure.

FIG. 3 is a specific application example of a method for processing autonomous transmission of a UE according to Embodiment 2 of the present disclosure. As illustrated in FIG. 3, the method includes the following steps.

In step 310, the UE reports capability information.

When a TSC service arrives and the TSC service is supported, the UE can actively report the capability information to the network device. The capability information may include a capability of the UE to support an autonomous transmission, a capability to allow coexistence of the autonomous transmission and a scheduled retransmission, a Rel-16 collision handling capability, and a capability to support TSC/URLLC.

In step 311, the network device determines whether to configure or activate an autonomous transmission of the UE based on second information.

The network device determines whether to configure or activate the autonomous transmission of the UE based on the second information. The second information includes the capability information and/or the grant policy and/or the service information and/or the resource configuration information. Specifically, the CG resource is configured, the first time length is configured, and the UE is instructed to perform the autonomous transmission on the de-prioritized grant within the first time length. The first time length is used for determining whether to enable the autonomous transmission and/or the time for the UE to perform the autonomous transmission and/or the time for the network retransmission grant. The first time length may be the first timer or the second timer configured by the network.

In step 312, first information is transmitted.

After the network device configures a resource for the UE based on the second information, the first information is transmitted to the UE. The first information is used for determining whether the UE performs the autonomous transmission. The first information includes autonomous transmission information or information indicating activation or configuration of the autonomous transmission. The first timer is configured in the first information.

In step 313, it is determined from the first information that the autonomous transmission is configured.

The UE receives the first information, determines to enable the autonomous transmission based on the first information, and performs the autonomous transmission based on the first timer.

In step 314, the indication information of a grant for retransmission is not expected within the time length of the first timer.

The UE returns to the network device the indication information that a grant for retransmission is not expected within the time length of the first timer, and thus the network device will not schedule a retransmission of a de-prioritized grant within the first time length.

In step 315, the autonomous transmission is performed based on the first information.

The UE performs the autonomous transmission within the time length of the first timer based on the first information transmitted by the network device, and does not expect a grant for retransmission from the network device. Specifically, if the UE has an available CG resource within the time length of the first timer, the autonomous transmission is performed within the time length of the first timer. It should be noted that the CG resource here can be a resource for the same CG or a different CG, and the present disclosure is not limited to any of these examples here.

In step 316, no retransmission is scheduled within the time length of the first timer.

The network device does not schedule a retransmission of an object of a de-prioritized grant on the UE side within the time length of the first timer. That is, the UE does not expect a grant for retransmission from the network device. The network device may schedule a retransmission of the object of the de-prioritized grant on the UE side after the time length of the first timer lapses. Further, the network device may not schedule a grant for retransmission of the object of the de-prioritized grant on the UE side after the time length of the first timer lapses.

With the above method for processing the autonomous transmission of the UE, when the autonomous transmission and the scheduled retransmission coexist, only the autonomous transmission or only the retransmission grant is allowed within one time length of the timer, such that the implementation complexity of the UE can be reduced when the autonomous transmission of the UE and a network scheduled retransmission coexist, and the process is simple and clear, thereby reducing complexity of the UE and standardization work.

Embodiment 3

Figure 4:
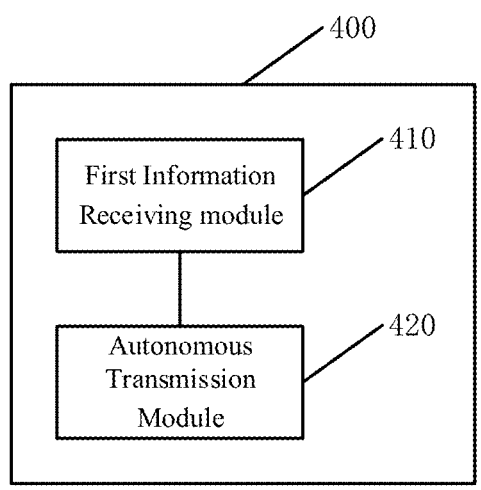
FIG. 4 is a block diagram showing an apparatus for processing autonomous transmission of a UE according to Embodiment 3 of the present disclosure.

FIG. 4 illustrates an apparatus 400 for processing autonomous transmission of a UE according to Embodiment 3 of the present disclosure. The apparatus includes a first information receiving module 410 and an autonomous transmission module 420.

The first information receiving module 410 is configured to receive first information. The first information includes autonomous transmission information or information indicating activation or configuration of the autonomous transmission.

The autonomous transmission module 420 is configured to perform the autonomous transmission based on the first information, in response to determining from the first information that the autonomous transmission is configured or activated. That is, it is determined based on the first information whether the autonomous transmission is configured or activated. If the first information is configured or activated, the autonomous transmission module 420 performs the autonomous transmission; otherwise, the autonomous transmission is not performed.

Optionally, the apparatus according to this embodiment may further include a retransmission grant expecting module. The retransmission grant expecting module is configured to transmit an instruction indicating that a grant for retransmission is expected to the network device, i.e., expect a grant for retransmission, in response to determine from the first information that the autonomous transmission is configured or activated.

Optionally, the first information may include a first time length. The first time length is used for determining whether to enable the autonomous transmission and/or time for the UE to perform the autonomous transmission and/or time for the network to schedule a retransmission. The first time length may be a first timer that is non-predetermined or non-predefined or an activation instruction. The activation instruction is used for activating a second timer that is predetermined or predefined. The autonomous transmission module 420 is configured to perform the autonomous transmission within a time length of the first timer or the second timer in response to the first time length including an available CG resource. It should be noted that the CG resource here can be a resource for the same CG or a different CG, and the present disclosure is not limited to any of these examples here.

Optionally, the apparatus according to this embodiment further includes a capability reporting module. The capability reporting module is configured to report capability information of the device. The capability information may include at least one of a capability to support the autonomous transmission, a capability to handle coexistence of the autonomous transmission and a scheduled retransmission, a collision handling capability, and a resource processing capability.

For details that are not described in Embodiment 3, reference may be made to the same or corresponding description in Embodiment 1 and Embodiment 2, and description thereof will be omitted here.

In an embodiment, with the apparatus for processing the autonomous transmission of the UE, after the first information of the network device is received, it is determined based on the first information whether to enable the autonomous transmission of a certain object. If the network device configures or activates the autonomous transmission of the UE, the network device does not schedule a retransmission within the first time length. That is, the UE does not expect a grant for retransmission from the network. If the network device does not configure or activate the autonomous transmission of the UE, the network device can schedule a retransmission. That is, the UE expects a grant for retransmission from the network. With the apparatus for processing the autonomous transmission of the UE according to this embodiment, the implementation complexity of the UE can be reduced when the autonomous transmission of the UE and a network scheduled retransmission coexist, and the process is simple and clear, thereby reducing complexity of the UE and standardization work.

Embodiment 4

Figure 5:
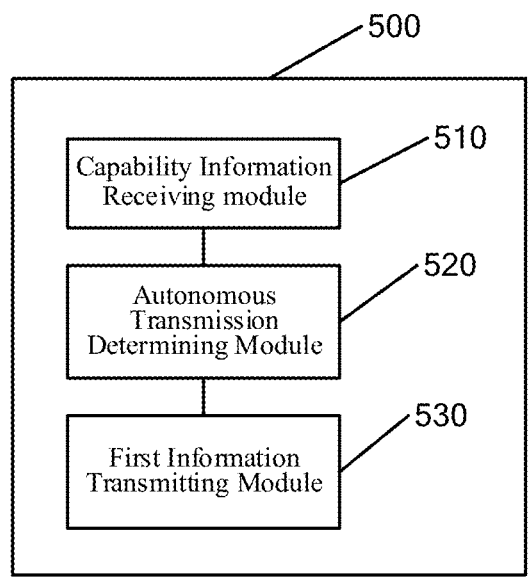
FIG. 5 is a block diagram showing an apparatus for processing autonomous transmission of a UE according to Embodiment 4 of the present disclosure.

FIG. 5 is a block diagram showing a structure of an apparatus 500 for processing autonomous transmission of a UE according to Embodiment 4 of the present disclosure. As illustrated in FIG. 5, the apparatus includes a capability information receiving module 510, an autonomous transmission determining module 520, and a first information transmitting module 530.

The capability information receiving module 510 is configured to receive capability information reported by the UE. The capability information includes at least one of a capability to support the autonomous transmission, a capability to handle coexistence of the autonomous transmission and a scheduled retransmission, a collision handling capability, and a resource processing capability.

The autonomous transmission determining module 520 is configured to determine whether to configure or activate the autonomous transmission of the UE based on second information. The second information includes at least one of capability information, a scheduling policy, service information, and resource configuration information. The autonomous transmission information or the information indicating the activation or the configuration of the autonomous transmission includes a first time length. The first time length is used for determining whether to enable the autonomous transmission of the UE and/or time for the UE to perform the autonomous transmission and/or time to schedule the retransmission for the UE. The first time length may be a first timer that is non-predetermined or non-predefined or an activation instruction. The activation instruction is used for activating a second timer that is predetermined or predefined. Optionally, the first timer may be a timer configured by the network.

The first information transmitting module 530 is configured to transmit first information to UE. The first information is used for determining whether the UE is to perform the autonomous transmission.

Optionally, the apparatus according to this embodiment may further include a retransmission scheduling module.

The retransmission scheduling module is configured to schedule a retransmission for the UE, in response to the first information including no autonomous transmission information or indicating no activation or configuration of the autonomous transmission.

Optionally, the apparatus according to this embodiment may further include a retransmission scheduling module. The retransmission scheduling module is configured to refrain from scheduling a retransmission for the UE, in response to the first information including autonomous transmission information or information indicating activation or configuration of the autonomous transmission.

Optionally, the apparatus according to this embodiment may further include a retransmission scheduling module. The retransmission scheduling module is configured to schedule, in response to the first information including autonomous transmission information or information indicating activation or configuration of the autonomous transmission, a retransmission for the UE when a predetermined condition is satisfied. The predetermined condition can be, for example, a de-prioritized MAC PDU being present or saved and the UE not being able to autonomously transmit the de-prioritized MAC PDU due to lack of CG resource, or a de-prioritized MAC PDU being present or saved and the network device not expecting the UE to perform autonomous transmission, or the like. Of course, the predetermined condition can be set based on specific conditions and requirements, or it can be e.g., a de-prioritized MAC PDU being present or saved but no autonomous retransmission being received within the first time length, or a de-prioritized MAC PDU being present or saved but no autonomous retransmission being received after the first time length lapses, and the present disclosure is not limited to any of these examples.

Optionally, in another embodiment, if the network device receives no autonomous transmission from the UE side within the first time length, the network device determines that there is no de-prioritized MAC PDU, and/or the network device performs no retransmission grant.

If the first time length is configured in the first information, the retransmission scheduling module does not schedule a retransmission for the UE within the first time length. If there is an available CG resource in the first time length, the UE performs the autonomous transmission in the first time length. It should be noted that the CG resource here can be a resource for the same CG or a different CG, and the present disclosure is not limited to any of these examples here.

Optionally, the autonomous transmission determining module 520 may be configured to determine whether to configure or activate the autonomous transmission of the UE based on the second information. The first information transmitting module 530 may be configured to transmit the first information to the UE. The first information includes the autonomous transmission information, or the information indicating the activation or the configuration of the autonomous transmission. The network device does not schedule any retransmission at any time.

Optionally, the autonomous transmission determining module 520 may be configured to determine whether to configure or activate the autonomous transmission of the UE based on the second information. The first information transmitting module 530 is configured to transmit the first information to the UE. The first information includes no autonomous transmission information, or indicates no activation or configuration of the autonomous transmission. The network device schedules a retransmission and the UE never needs to perform the autonomous transmission. That is, the UE does not perform the autonomous transmission.

For details that are not described in Embodiment 4, reference may be made to the same or corresponding description in Embodiment 1 and Embodiment 2, and description thereof will be omitted here.

In this embodiment, the network device determines whether to configure or activate the autonomous transmission of the UE based on the second information, and transmits the first information to the UE. The first information includes the autonomous transmission information or information indicating the activation or the configuration of the autonomous transmission. The UE may determine whether to enable the autonomous transmission of a certain object based on the first information. If the network device configures or activates the autonomous transmission of the UE, the network device does not schedule a retransmission within the first time length. That is, the UE does not expect a grant for retransmission from the network. If the network device does not configure or activate the autonomous transmission of the UE, the network device can schedule a retransmission. That is, the UE expects a grant for retransmission from the network. With the apparatus for processing the autonomous transmission of the UE according to an embodiment, the implementation complexity of the UE can be reduced when the autonomous transmission of the UE and a network scheduled retransmission coexist, and the process is simple and clear, thereby reducing complexity of the UE and standardization work.

Embodiment 5

Figure 6:
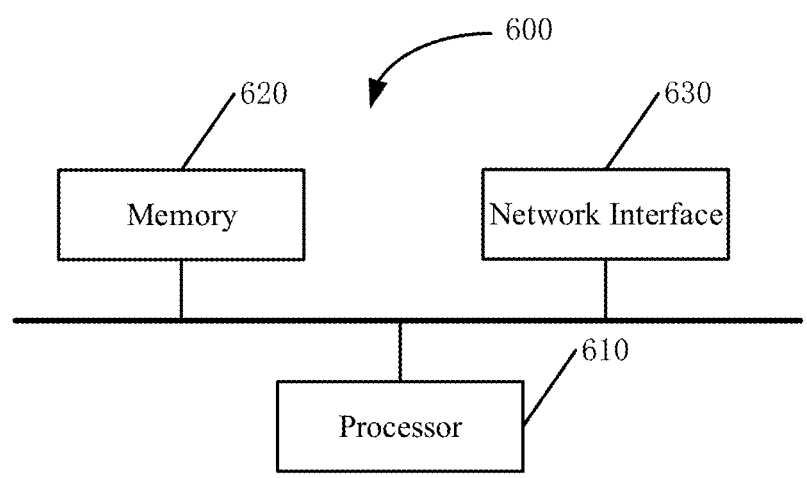
FIG. 6 is a block diagram showing an apparatus for processing autonomous transmission of a UE according to Embodiment 5 of the present disclosure.

FIG. 6 is a block diagram showing an apparatus 600 for processing autonomous transmission of a UE according to Embodiment 3 or Embodiment 4 of the present disclosure. As illustrated in FIG. 6, the apparatus 600 includes a processor 610, a memory 620, and a network interface 630. The processor 610 is configured to invoke a program in the memory 620 to perform a corresponding process implemented by the network device in the method for processing the autonomous transmission of the UE according to Embodiment 1, or perform a corresponding process implemented by the terminal device in the method for processing the autonomous transmission of the UE according to Embodiment 1, and transmits a result of performing the process via the network interface 630.

The processor 610 may be an independent component or a collective expression for a plurality of processing components. For example, the processor 610 may be a Central Processing Unit (CPU), an Application Specific Integrated Circuit (ASIC), or one or more integrated circuits configured to implement the above method, such as at least one microprocessor Digital Signal Processor (DSP), or at least one Field Programmable Gate Array (FPGA).

The present disclosure is described with reference to flowcharts and/or block diagrams of the method, the device (the system), and computer program products according to embodiments of the present disclosure. It should be understood that each process and/or block in the flowcharts and/or block diagrams, and a combination of processes and/or blocks in the flowcharts and/or block diagrams can be realized by computer program instructions. These computer program instructions can be provided to a processor of a general-purpose computer, a special-purpose computer, an embedded processor, a chip, or other programmable data processing device to generate a machine, such that instructions executed by a processor of a computer or other programmable data processing device can generate an apparatus for realizing functions specified in one or more flows in the flowchart and/or one or more blocks in the block diagram. The program may be stored in a computer-readable storage medium. The storage medium may include a Read Only Memory (ROM), a Random Access Memory (RAM), a magnetic disk, an optical disk, and the like.

The above embodiments illustrate but do not limit the present disclosure. Those skilled in the art can design different alternative examples within the scope of the claims. Those skilled in the art can appreciate that appropriate adjustments, modifications, etc. can be made to specific implementations within the scope of the present disclosure as defined by the attached claims. Therefore, any modifications and changes made in accordance with the spirit and principle of the present disclosure are within the scope of the present disclosure defined by the attached claims.

What is claimed is:

1. A method for processing autonomous transmission of a User Equipment (UE), applied in the UE, the method comprising:
reporting capability information, wherein the capability information comprises a collision handling capability of supporting handling of resource collision scenarios comprising any one or more of Dynamic Grant (DG) vs. Configured Grant (CG), CG vs. CG, DG vs. DG, and Uplink (UL)-Shared Channel (SCH) vs. Uplink Control Information (UCI), in which a de-prioritized Medium Access Control (MAC) Protocol Data Unit (PDU) is present;
receiving, by the UE, first information comprising autonomous transmission information or information indicating activation or configuration of the autonomous transmission; and
performing the autonomous transmission based on the first information, in response to determining from the first information that the autonomous transmission is configured or activated.

2. The method according to claim 1, wherein the first information comprises a first time length, the first time length being used for determining time for the UE to perform the autonomous transmission.

3. The method according to claim 2, wherein the first time length is further used for determining whether to enable the autonomous transmission and/or time for a network to schedule a retransmission.

4. The method according to claim 2, wherein the first time length is a first timer that is non-predetermined or non-predefined, or an activation instruction used for activating a second timer that is predetermined or predefined.

5. The method according to claim 4, wherein said performing the autonomous transmission based on the first information comprises:
performing the autonomous transmission within a time length of the first timer or the second timer by using an available CG resource within the first time length.

6. The method according to claim 1,
wherein the capability information further comprises a capability to support the autonomous transmission.

7. The method according to claim 6, wherein the capability information further comprises at least one of a capability to handle coexistence of the autonomous transmission and a scheduled retransmission, and a resource processing capability.

8. The method according to claim 1, further comprising:
expecting a grant for retransmission, in response to determining from the first information that the autonomous transmission is not configured or activated.

9. A User Equipment (UE), comprising:
a processor; and
a memory,
wherein the processor is configured to invoke a program in the memory to:
report capability information, wherein the capability information comprises a collision handling capability of supporting handling of resource collision scenarios comprising any one or more of Dynamic Grant (DG) vs. Configured Grant (CG), CG vs. CG, DG vs. DG, and Uplink (UL)-Shared Channel (SCH) vs. Uplink Control Information (UCI), in which a de-prioritized Medium Access Control (MAC) Protocol Data Unit (PDU) is present;
receive first information comprising autonomous transmission information or information indicating activation or configuration of the autonomous transmission; and
perform autonomous transmission of the UE based on the first information, in response to determining from the first information that the autonomous transmission is configured or activated.

10. The UE according to claim 9, wherein the first information comprises a first time length, the first time length being used for determining time for the UE to perform the autonomous transmission.

11. The UE according to claim 10, wherein the first time length is further used for determining whether to enable the autonomous transmission and/or time for a network to schedule a retransmission.

12. The UE according to claim 10, wherein the first time length is a first timer that is non-predetermined or non-predefined, or an activation instruction used for activating a second timer that is predetermined or predefined.

13. The UE according to claim 12, wherein said performing the autonomous transmission based on the first information comprises:
performing the autonomous transmission within a time length of the first timer or the second timer by using an available CG resource within the first time length.

14. The UE according to claim 9,
wherein the capability information further comprises a capability to support the autonomous transmission.

15. The UE according to claim 14, wherein the capability information further comprises at least one of a capability to handle coexistence of the autonomous transmission and a scheduled retransmission, and a resource processing capability.

16. The UE according to claim 9, wherein the processor is further configured to invoke a program in the memory to:
expect a grant for retransmission, in response to determining from the first information that the autonomous transmission is not configured or activated.

17. A network device, comprising:
a processor; and
a memory,
wherein the processor is configured to invoke a program in the memory to:
receive capability information of a User Equipment (UE), wherein the capability information comprises a capability to support autonomous transmission of the UE, and a collision handling capability of supporting handling of resource collision scenarios comprising any one or more of Dynamic Grant (DG) vs. Configured Grant (CG), CG vs. CG, DG vs. DG, and Uplink (UL)-Shared Channel (SCH) vs. Uplink Control Information (UCI), in which a de-prioritized Medium Access Control (MAC) Protocol Data Unit (PDU) is present;

determine whether to configure or activate the autonomous transmission of the UE based on second information, wherein the second information comprises at least one of capability information, a scheduling policy, service information, and resource configuration information; and transmit first information, wherein the first information is used for determining whether the UE is to perform the autonomous transmission.

18. The network device according to claim 17, wherein the processor is further configured to invoke the program in the memory to:

schedule a retransmission for the UE in response to the first information comprising no autonomous transmission information or indicating no activation or configuration of the autonomous transmission.

19. The network device according to claim 17, wherein the processor is further configured to invoke the program in the memory to:

schedule, in response to the first information comprising autonomous transmission information or information indicating activation or configuration of the autonomous transmission, a retransmission for the UE when a predetermined condition is satisfied.

20. The network device according to claim 19, wherein the autonomous transmission information or the information indicating the activation or the configuration of the autonomous transmission comprises a first time length, the first time length being used for determining whether time for the UE to perform the autonomous transmission.

* * * * *